US011639303B2

(12) United States Patent
Trifkovic et al.

(10) Patent No.: US 11,639,303 B2
(45) Date of Patent: *May 2, 2023

(54) ENHANCED FLOCCULATION OF INTRACTABLE SLURRIES USING SILICATE IONS

(71) Applicant: EnviCore Inc., Calgary (CA)

(72) Inventors: Milana Trifkovic, Calgary (CA); Shahrukh Shamim, Calgary (CA); Aleksandra Govedarica, Calgary (CA); Mahmoud Ansari, Calgary (CA)

(73) Assignee: EnviCore Inc., Calgary (CA)

( * ) Notice: Subject to any disclaimer, the term of this patent is extended or adjusted under 35 U.S.C. 154(b) by 111 days.

This patent is subject to a terminal disclaimer.

(21) Appl. No.: 17/165,472

(22) Filed: Feb. 2, 2021

(65) Prior Publication Data
US 2021/0155511 A1 May 27, 2021

Related U.S. Application Data

(63) Continuation of application No. 16/448,923, filed on Jun. 21, 2019, now Pat. No. 10,906,821.

(60) Provisional application No. 62/688,000, filed on Jun. 21, 2018.

(51) Int. Cl.
*C02F 1/52* (2006.01)
*C02F 1/56* (2006.01)
*C02F 101/10* (2006.01)
*C02F 101/32* (2006.01)
*C02F 11/143* (2019.01)
*C02F 11/148* (2019.01)
*C02F 103/10* (2006.01)

(52) U.S. Cl.
CPC .............. *C02F 1/5245* (2013.01); *C02F 1/56* (2013.01); *C02F 11/143* (2019.01); *C02F 11/148* (2019.01); *C02F 2101/10* (2013.01); *C02F 2101/32* (2013.01); *C02F 2103/10* (2013.01)

(58) Field of Classification Search
CPC ........ C02F 1/56; C02F 11/143; C02F 11/148; C02F 2101/32; C02F 2103/10
See application file for complete search history.

(56) References Cited

U.S. PATENT DOCUMENTS

| | | |
|---|---|---|
| 2010/0104744 A1 | 4/2010 | Moffett |
| 2013/0019780 A1 | 1/2013 | Karimi et al. |
| 2013/0206702 A1 | 8/2013 | Lin et al. |
| 2014/0007795 A1 | 1/2014 | Moffett et al. |
| 2015/0041370 A1 | 2/2015 | Lin et al. |
| 2016/0272525 A1 | 9/2016 | Moffett |
| 2018/0362371 A1 | 12/2018 | Favero et al. |

FOREIGN PATENT DOCUMENTS

| | | |
|---|---|---|
| CA | 1109408 A | 9/1981 |
| CA | 1238597 A | 6/1988 |
| CA | 2823459 A1 | 2/2015 |
| CA | 2912898 A1 | 10/2016 |
| CA | 3047562 A1 | 12/2019 |
| CN | 103318995 A | 9/2013 |
| WO | 2010056539 A1 | 5/2010 |
| WO | 2012075399 A2 | 6/2012 |
| WO | 2012088291 A1 | 6/2012 |
| WO | 2013096787 A1 | 6/2013 |
| WO | 2014153431 A1 | 9/2014 |

OTHER PUBLICATIONS

"Suncor Energy Inc. Tailings Reduction Operations Application", https://www.canoils.com/Universal/View.aspx?type=Story&id=4692, Oct. 28, 2009.
Alomair, Osamah A, et al., "Nanofluids Application for Heavy Oil Recovery", Society of Petroleum Engineers (SPE), Presented at SPE Asia Pacific Oil & Gas Conference and Exhibition, Adelaide, Australia, Oct. 14-16, 2014, Oct. 14, 2014.
Andreola, Fernanda , et al., "Release of Ions from Kaolinite Dispersed in Deflocculant Solutions", Applied Clay Science 36 (2007) 271-278, Nov. 14, 2006.
Azam, Shahid , "Effect of Composition and Morphology on Self-Weight Settling of Laterite Ore Slurries", Geotech Geol. Eng. (2012) 30:107-118, Sep. 22, 2011.
BCG Engineering, Inc. , "Oil Sands Tailings Technology Review", Oil Sands Research and Information Network, University of Alberta, School of Energy and the Environment, Edmonton, Alberta, Canada. OSRIN Report No. TR-1. 136 pp., 2010.
Chalaturnyk, Richard J, et al., "Managment of Oil Sands Tailings", Petroleum Science and Technology, 20:9-10, 1025-1046; https://doi.org/10.1081/LFT-120003695, Dec. 2, 2001.
De Kretser, Ross , et al., "Improving Clay-Based Tailings Disposal: Case Study on Coal Tailings", AIChE Journal, vol. 43, No. 7, 1997, 1894-1903.
Devenny, David W, "A Screening Study of Oil Sand Tailings Technologies and Practices", Prepared for Alberta Energy Research Institute (AERI) Contract 2008 0326, Revision I, Mar. 2010, 2010.
Emady, Heather, et al., "Colloidal Microstructure Effects on Particle Sedimentation in Yield Stress Fluids", Journal of Rheology 57, Oct. 10, 2013, 1761-1772.

(Continued)

Primary Examiner — Bradley R Spies
(74) Attorney, Agent, or Firm — Peacock Law P.C.; Marco H. Santamaria; Deborah A. Peacock

(57) ABSTRACT

Methods are provided for treating intimately dispersed mixtures of water, bitumen, and fine clay particles, such as oil sands mature fine tailings (MFT). Select methods use dissolved silicate ions and a base (alkali), optionally in combination with a biopolymer, to flocculate a slurry. A mixing regime is disclosed involving the addition to MFT of silicate ions in solution and alkali, to initiate aggregation/destabilization of clay particles. Methods are exemplified that provide distinct sediment layers in conjunction with the release of residual bitumen (for example 40-50% of the initial bitumen content). In these exemplified embodiments, a densely packed bottom layer containing ~75 wt. % solids showed high yield stress values (3.5-5.5 kPa) and entrapped little residual bitumen (0.2-0.3 wt. %). The methods accordingly segregate a material suitable for reclamation.

21 Claims, 1 Drawing Sheet

(56) References Cited

OTHER PUBLICATIONS

Farkish, Aida, et al., "Rapid Dewatering of Oil Sand Mature Fine Tailings Using Super Absorbent Polymer (SAP)", Minerals Engineering 50-51 (2013) 38-47, Jul. 4, 2013.
Gumfekar, Sarang P, et al., "Advanced Polymer Flocculants for Solid-Liquid Separation in Oil Sands Tailings", Macromol. Rapid Commun. 2018, 1800644, 2018.
Kasperski, Kim L, "A Review of Properties and Treatment of Oil Sands Tailings", AOSTRA Journal of Research, 8 (1992) 11, Dec. 3, 1992.
Kinnunen, Paivi H-M, et al., "Towards Circular Economy in Mining: Opportunities and Bottlenecks for Tailings Valorization", Journal of Cleaner Production 228 (2019) 153-160, Apr. 16, 2019.
Kotlyar, L. S., et al., "Characterization of Colloidal Solids from Athabasca Fine Tails", Clays and Clay Minerals, vol. 41, No. 3, 1993, 341-345.
Kotlyar, L. S, et al., "The Role of Biwetted Colloidal Solids in Structure Formation in Oil Sands Fine Tails", Fuel Science and Technology International, 12:6, 923-935, Mar. 23, 2007.
Krekeler, Mark P.S., et al., "Mineralogical and Geochemical Investigation of Clay-Rich Mine Tailings from a Closed Phosphate Mine, Bartow Florida, USA", Environ. Geol. (2008) 55:123-147, Oct. 11, 2007.
Li, Yuan, "Fundamental Study of the Sedimentation of Copper Tailings with Kynch Theory", Thesis, University of British Columbia, Vancouver, 2015.
Ma, Kunsong, et al., "Effect of Interaction Between Clay Particles and Fe3+ Ions on Colloidal Properties of Kaolinite Suspensions", Clays and Clay Minerals, vol. 45, No. 5, 733-744, 1997.
Majid, Abdul, et al., "Role of Hydrophobic Solids in the Stability of Oil Sands Fine Tailings", Fuel 1996 vol. 75 No. 7, Nov. 10, 1995, 879-884.
Mercier, P.H. J, et al., "Colloidal Clay Gelation: Relevance to Current Oil Sands Operations", Petroleum Science and Technology, 30:9, 915-923, Mar. 19, 2012.
Merkak, Othmane, et al., "Migration and Sedimentation of Spherical Particles in a Yield Stress Fluid Flowing in a Horizontal Cylindrical Pipe", AIChE Journal, vol. 55, No. 10, Jul. 28, 2009, 2515-2525.
Nusri, Saeed, et al., "Using Surface Geopolymerization Reactions to Strengthen Athabasca Oil Sands Mature Fine Tailings", Can. J. Chem. Eng. vol. 94, Issue 9, Jun. 1, 2016.
Nusri, Saeed El Khair, "Using Surface Geopolymerization Reactions to Strengthen Athabasca Oil Sands Mature Fine Tailings", University of Alberta, Department of Chemical and Materials Engineering, Thesis, 2015.
Orland, Kevin, "Oilsands Ponds Full of 340 Billion Gallons of Toxic Sludge Spur Fears of Environmental Catastrophe", https://financialpost.com/commodities/energy/340-billion-gallons-of-sludge-spur-environmental-fears-in-canada, Jan. 16, 2018.
Ovarlez, Guillaume, et al., "Shear-Induced Sedimentation in Yield Stress Fluids", Journal of Non-Newtonian Fluid Mechanics, Nov. 1, 2018.
Proskin, S., et al., "Oil Sands MFT Properties and Freeze-Thaw Effects", J. Cold. Reg. Eng., vol. 26, No. 2, May 15, 2012.
Ripmeester, John A, et al., "2H NMR and the Sol-Gel Transition in Suspensions of Colloidal Clays", Colloids and Surfaces A: Physicochemical and Engineering Aspects, 78 (1993) 57-63, Mar. 8, 1993.
Roussel, Nicolas, "Steady State Flow of Cement Suspensions: A Micromechanical State of the Art", Cement and Concrete Research 40, Aug. 28, 2009, 77-84.
Scott, J. Don, et al., "Behaviour of the Clay/Bitumen/Water Sludge System from Oil Sands Extraction Plants", Applied Clay Science, 1 (1985), 207-218, Mar. 11, 1985.
Snabre, Patrick, et al., "Size Segregation in a Fluid-Like or Gel-Like Suspension Settling under Gravity or in a Centrifuge", Langmuir 2008, 24, Nov. 6, 2008, 13338-13347.
Sobkowicz, John, et al., "Oil Sands Tailings Technology Deployment Roadmaps, Project Report to Alberta Innovates, vol. 1", Jun. 29, 2012.
Sobkowicz, John, et al., "Oil Sands Tailings Technology Deployment Roadmaps, Project Report to Alberta Innovates, vol. 2", Jun. 22, 2012.
Stephens, Brett, et al., "Oil Sands Tailings Technology Deployment Roadmaps, Project Report to Alberta Innovates, vol. 3", Jun. 28, 2012.
Sun, Xiaofei, et al., "Application of Nanoparticles in Enhanced Oil Recovery: A Critical Review of Recent Progress", Energies 2017, 10, 345, Mar. 11, 2017.
Sworska, A., et al., "iFlocculation of the Syncrude Fine Talings: Part I. Effect of pH, Polymer Dosage and Mg2+ and Ca2+ Cations", Int. J. Miner. Process 60 (2000) 143-152, Apr. 6, 2000.
Trappe, Veronique, et al., "Colloidal Gels—Low-Density Disordered Solid-Like States", Current Opinion in Colloid and Interface Science 8, 2004, 494-500.
Vedoy, Diogenes R, et al., "Water-Soluble Polymers for Oil Sands Tailing Treatment: A Review", Can. J. Chem. Eng. 93:888-904, 2015, Mar. 19, 2015.
Wang, Chen, et al., "Current State of Fine Mineral Tailings Treatment: A Critical Review on Theory and Practice", Minerals Engineering 58 (2014) 113-131, Feb. 14, 2014.
Wislesky, Irwin, et al., "Oil Sands Tailings Technology Deployment Roadmaps, Project Report to Alberta Innovates, vol. 4", Jun. 29, 2012.

FIG. 1A
FIG. 1B
FIG. 1C
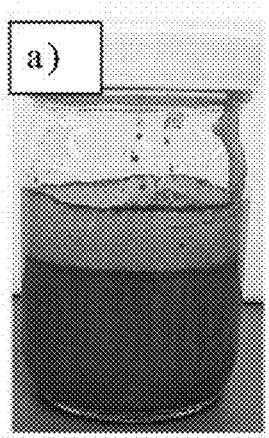
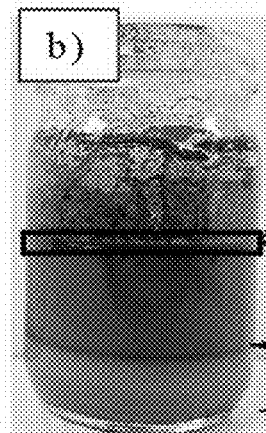
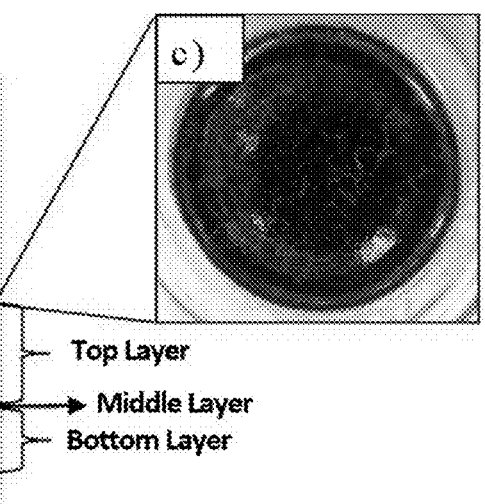
– Top Layer
– Middle Layer
– Bottom Layer
FIG. 2
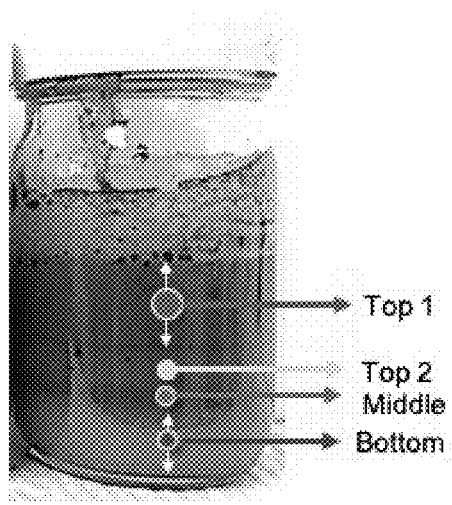
– Top 1
– Top 2
– Middle
– Bottom

ENHANCED FLOCCULATION OF INTRACTABLE SLURRIES USING SILICATE IONS

CROSS-REFERENCE TO RELATED APPLICATIONS

This application is a continuation application of U.S. patent application Ser. No. 16/448,923, filed on Jun. 21, 2019, entitled "ENHANCED FLOCCULATION OF INTRACTABLE SLURRIES USING SILICATE IONS," issuing as U.S. Pat. No. 10,906,821 on Feb. 2, 2021, which itself claims priority to and the benefit of the filing of U.S. Provisional Patent Application No. 62/688,000, filed on Jun. 21, 2018, and the specifications and claims thereof are incorporated herein by reference.

FIELD

The invention is in the field of material separations, in particular separating solid material from water in the separation of the components of tailings waste streams from oil sands mining operations. Processes are provided for the flocculation/destabilization of mature fine tailings (MFT) using silicate ions in solution, with optional co-addition of biopolymers such as polysaccharides, these processes may include extraction of residual bitumen from the tailings, and extraction and utilization of the top layer nanoclays as a value added product.

BACKGROUND

In general, oil sands are a mixture of the mineral matter, bitumen, and water in different proportions. The average bitumen content in oil sands is 12% by total mass with water content varying between 3-6%. Mineral matter, predominantly sand and silt, quartz, and clays range between 84 to 86% by total mass [1].

Hot water extraction of bitumen from oil sands involves utilization of water and caustic soda that results in the formation of waste streams in the form of mineral tailings slurries or suspensions comprising water, silt, clays, unrecovered bitumen, and residual solvent that require further treatment. These tailings are deposited into large settling basins where the bigger particles (sand and quartz) settle by gravity over time resulting in stable mineral suspensions called mature fine tailings (MFT) or fluid fine tailings (FFT). Consolidation of MFT is estimated to take thousands of years [2][3].

MFT suspension can be considered as a colloidal system, containing variety of clays (kaolinite being the most dominant fraction), hydrocarbons and residual solvents, which exhibits slow settling rates, gel like behavior, thixotropy, and aging. [4][5] Several processes such as flocculation/coagulation, freeze/thaw method, centrifuging, etc., have been developed in the last decades to overcome the MF settling problem ([6], CA2823459, US2010/0104744, US2013/0206702, US2013/0019780, US2014/0007795).

Flocculation of MFT using polymers is widely explored field, reportedly capable of relatively high efficiency in relatively rapid dewatering of tailings streams [7], [8]. Commonly used polymers for flocculation processes include polyacrylamide (PAM), polyethylene oxide (PEO), chitosan-based polymers [9].

Despite the reported advantages of selected flocculants as reclamation agents, there remain issues associated with unpredictable performance due at least in part to tailings compositional variability [10], including issues associated with operational control for long term stability and the strength of the sediment produced by polymer treated MFT.

SUMMARY

In one aspect, processes are disclosed that can provide a strengthened MFT sediment. Processes may for example involve treating a slurry (such as an MFT mixture) comprising an intimately dispersed mixture of water, bitumen, and fine clay particles, for example having a slurry solids content of 20-50%, a pH of 7 to 8.5 (in exemplary embodiments from 7.4 to 8.1), an aluminate concentration of less than 85 mg/L (in exemplary embodiments less than 82.837 mg/L) and a sulfate concentration of less than 110 mg/L (in exemplary embodiments less than 108.9 mg/L). The slurry may for example have a solids content of greater than 30 wt % or from 30-50 wt %, or from 30-47 wt %. The process may involve:

- adding (for example with mixing) a source of silicate $H_3SiO_4^-$ ions to the slurry to provide a silicate-treated slurry having a silicate ion dosage of about 350-20,000 ppm (defined for example as grams of agent per metric ton of dry tailings);
- optionally adding (for example with mixing) a biopolymer co-agent in the form of polysaccharides (such as xanthan gum and guar gum) in the dosage of 500-2000 ppm (defined for example as grams of agent per metric ton of dry tailings);
- adding (for example with mixing) an alkali (such as KOH, NaOH, $Ca(OH)_2$, $NH_4OH$ or $Na_2CO_3$) to the silicate-treated slurry to raise the pH to provide a basic silicate-treated slurry having a pH of from about 9 to about 12, being for example about 10; and,
- allowing the basic silicate-treated slurry to separate into a plurality of layers having distinct densities, wherein a bottom layer comprises packed clay particles.

The process may for example be carried out so that adding the base to the silicate-treated slurry to raise the pH initiates polycondensation of silicate ions on clay particles so as to form aggregates. In some embodiments, the silicate ions may combine with calcium and hydroxyl ions in the silicate-treated slurry, to form a calcium-silicate-hydrate gel (C—S—H gel), and the C—S—H gel may in turn impart strength to a flocculated sludge.

The process may for example be carried out so that the layers form under a flocculation force of less than 2 $g_0$ or less than 1.5 $g_0$ or at about 1 $g_0$.

The bottom layer which is formed may be made up of a layer of packed clay particles, and this layer may have a desired bottom layer minimum dynamic shear strength (BLMDSS) value, for example of at least 1 kPa, or at least 2 kPa, or at least 3 kPa, or at least 3.5 kPa, or at least 4 kPa, or at least 4.5 kPa, or at least 5 kPa, or at least 5.5 kPa, or between about 3.5 kPa and 5.5 kPa. BLMDSS value of an aged bottom layer after 1 year may for example be at least 5 kPa, and/or after 5 years may be at least 10 kPa. The packed clay particle layer may also or alternatively have a bottom layer minimum compressive strength, for example of at least 5 kPa, or at least 10 kPa or at least 15 kPa, or between about 5 kPa and 15 kPa.

In some embodiments, prior to the addition of silicate, the slurry may be substantially free of aluminate.

One of the plurality of layers that forms as the process is carried out may be a water phase, for example being water available for recycle, for example having a desired calcium ion concentration, such as below about 30 ppm, or below about 25 ppm, or below about 20 ppm, or from about 15 to 30 ppm. In exemplary embodiments, the top layer water was characterized by inductively coupled plasma-mass spectroscopy (ICP-MS), and the water was found to contain 5.2-9.3 ppm $Ca^{2+}$.

The process may be carried out so that the basic silicate-treated slurry is capable of forming, within two days or less under a flocculation force of less than 2 $g_0$, at least three distinct layers having distinct densities. Alternatively, the flocculation force may be about 1 $g_0$.

The process may be carried out so that a middle layer forms, for example having at least 35 wt % solids and an initial middle layer minimum dynamic shear strength (MLMDSS) value of at least 50, 60, 70, 80, 90, or 100 Pa.

A top layer may form comprising nanoclay particles, for example as a dispersion of no measurable strength. This may be made up of illite rich illite/smectite mixed layer clays, kaolinite and illite, for example being poorly crystallized clay particles constituting 5-10 wt. % nanoclays, in some embodiments comprising nanoclays having a size range of from 80 to 200 nm. In a specific embodiment, the top layer can be segregated into two layers both containing nanoclays in concentration of 0.5-1 wt % and 9-10 wt %, respectively.

The silicate ion may for example be prepared from colloidal silica having a particle size range of about 4 nm to <1 mm, and the colloidal silica may be dissolved in alkaline aqueous solution at pH>10 or >11.

The silicate ion may also be prepared from solid sodium silicate (powdered or aggregated) having $SiO_2:Na_2O$ in ranges between 1.6:1 to 3.75:1.

The silicate ion may also be prepared for example from amorphous aluminosilicate materials.

A mat of bitumen may form on top of the layers, and this mat may comprise at least 25%, 30%, 35%, 40%, 45% or 50% of the total initial bitumen content of the slurry.

In select embodiments, the middle layer contained 50-55 wt. % solids, and the top layer contained ~5-8 wt % of solids (which were mainly clay particles in the nano-size range). Several possible applications for the top layer are disclosed. In an enhanced oil recovery (EOR) application, for example, the top layer was used after dilution to 1 wt % of solids and showed additional heavy oil recovery of 32.6% by 2 pore volumes of nanoclay flooding after water flooding. In another exemplified application, the top layer nanoclays may be used for formulizing complex fluids with improved performance in construction, lubrication, and oil and gas industries.

BRIEF DESCRIPTION OF THE DRAWINGS

FIGS. 1A-1C is a series of photographs illustrating a synergic effect of silicate ions and alkali addition on flocculation of MFT, showing conditions: a) immediately after flocculation, b) one day after flocculation, with formation of three distinct layers of varying solids and bitumen content, c) in a top view, of bitumen mat on the surface of MFT. As illustrated in frame (b), three distinct layers are formed after the treatment with silicate ions and alkali, having varying solid content, compaction, strength level and porosity.

FIG. 2 is a photograph illustrating the added synergistic effect of biopolymer addition in combination with silicate ion and alkali, where the segregation of the top layer into two layers both containing nanoclays in respective concentrations of 0.5-1 wt % and 9-10 wt % is evident.

DETAILED DESCRIPTION

Processes are provided for using silicate ions in solution, optionally in combination with bio-polymers, for the flocculation/treatment of slurries such as mature fine tailings (MFT), as well as the extraction of residual bitumen contained within the slurry or MFT structure. Methods are disclosed wherein the tailings clay solids are sedimented in distinct layers of specific density and/or strength. In select embodiments, processes provide for the liberation and accumulation of residual bitumen from the tailings water at the top of these layers. In typical circumstances, ultrafine/nanoclays may be obtained from a top layer (for example with sizes in the range of 80-200 nm, as extracted from MFT). These nanoparticles may for example be employed for formulizing complex fluids with improved performance in construction, lubrication, and oil and gas industries.

In an exemplified embodiment, methods are disclosed for removing solids from an MFT slurry, comprising treating the MFT (for example having a solids content ranging from 30-47 wt. %) using silicate ions in solution, optionally in combination with bio-polymers, followed by the addition of alkali for pH adjustment purposes (such as KOH, NaOH, $Ca(OH)_2$, $NH_4OH$ or $Na_2CO_3$). In this example, 80-100 gm of MFT was mixed using an overhead stirrer at 500 RPM for 2 minutes after which 350-20,000 ppm of silicate ions in solution (defined as grams of silicate ion per metric ton of dry tailings), optionally in combination with 500-2000 ppm of biopolymer (defined as grams of polymer per metric ton of dry tailings), was added to the MFT with continued mixing at the same rate. A solution of alkali (for example NaOH) was added to the MFT while mixing for additional 3 minutes in order to fix the final pH of the MFT suspension at about 10.0. Fixing the pH of the tailings stream after the addition of silicate ion solution to 10.0-10.5, in the exemplified case using 1M NaOH solution, initiates the destabilization of the tailings stream.

As illustrated in FIGS. 1A-1C three distinct layers (top, middle and bottom) formed after about 1 day of aging under a force of about 1 $g_0$ (~9.8 m/s$^2$), with varying levels of compactness and strength (set out in Table 1). The bottom layer was comprised of highly packed clay particles (~70-80 wt %) having in some cases strength values (initial dynamic yield stress) on the order of 5.5 kPa. Initial dynamic yield stress was quantified by performing an oscillatory stress sweep test. The tests were performed on Anton Paar MCR 302 rheometer using 25 mm sand blasted parallel plate geometry. The test comprises applying a predetermined oscillatory stress at constant frequency of 1 Hz with amplitude varying from low to high values in a logarithmic spread. Rheological response to the applied stress is obtained in terms of storage (G') and loss moduli (G"). Elastic and loss moduli show solid-like and liquid-like behavior of the material, respectively. The yield point is estimated from the crossover stress where G' is equal to G" and where all initial network in the material is broken. Layers such as this having relatively high strength are amendable to reclamation, for example without the need for subsequent drying. The strength of the sediment in exemplified embodiments ranged from 3.5-5.5 kPa, after about 2 days of gravity sedimentation, providing a relatively dense structure comprising 75-80 wt. % solids.

For comparison purposes, Table 1 also shows the values of a PAM polymer flocculated MFT, of significantly lower strength. The middle layer formed during the treatment with silicate ions showed compaction of up to 55 wt % solids and had strength values comparable to the PAM flocculated sediment (in the order of a few hundred Pa). Finally, the top layer was a very dilute nanoclay dispersion of no measurable strength.

In the embodiment where silicate ion was used in combination with the biopolymer to facilitate the MFT destabilization and sediment formation (FIG. 2), the bottom and middle layer were formed with the same compactness and strength as in the case employing silicate ions alone. The synergistic effect of biopolymer addition was observed through the top layer segregation into two layers of no measurable strength and solids content of 0.5-1 and 9-10 wt % (layers Top 1 and Top 2 in FIG. 2.)

A comparison was also performed to illustrate the stand alone effect of the alkali (for example NaOH) addition to the MFT. No visible sedimentation and dynamic yield strength was evident in the sample following only alkali addition, indicative of the role of silicate ions as the primary flocculating agent for the exemplified treatment of MFT.

In further aspects of the present process, methods are provided that enable the extraction of the residual bitumen from MFT in accordance with treatment protocols of the kind outlined above. In the exemplified embodiment, bitumen release was evident after about 1 day of flocculation. This may be facilitated by mixing dynamics during treatment, so as to result in relatively high mobility of free bitumen. The accumulation of bitumen and subsequent coalescence resulted in the formation of a distinct bitumen mat at the surface of the treated MFT. The total amount of the bitumen recovered from the MFT sample in the form of the separate bitumen mat layer was 40-50% of the initial bitumen content. In addition to the bitumen separated as a distinct phase at the top of the sample, some bitumen was still trapped in each of the layers formed, and the amount of bitumen therein correlated inversely with the density of the sediment. Bitumen content was measured after the full formation of the layers, where the top layer contained the majority (1.1-1.2 wt. %) and the bottom layer containing the least residual bitumen (0.15-0.2 wt. %), calculated per mass of the total layer tested (Table 1).

TABLE 1

Strength and compaction level of different layers forms after treating MFT with silicate ions and alkali (NaOH).

| Sample | Solids content (wt. %) | Bitumen Content (wt. %) | Strength (kPa) |
| --- | --- | --- | --- |
| Top Layer | 05-10 | 1.1-1.2 | — |
| Middle Layer | 50-55 | 0.7-0.8 | 0.1-0.2 |
| Bottom Layer | 70-80 | 0.15-0.20 | 3.5-5.5 |
| Control Sample (MFT + NaOH (pH~10) | No layer formation/ sedimentation observed | Unchanged | Not applicable |
| PAM flocculated MFT | 45 | — | ~0.3 |

In the exemplified embodiment, the source of silicate ion was from colloidal silica prepared by a modified Stöber method (having particle sizes in the range of 4 nm to <1 mm) or from commercially available solid sodium silicate. In the first embodiment, the colloidal silica can be dissolved in water at alkaline pH, in particular, the particles were dissolved in a controlled atmosphere using 2M NaOH solution at pH-12. The silicate ion generated in the dissolution process is $H_3SiO_4^-$ (based on a Pourbaix diagram). In the second embodiment, the solid sodium silicate dissolution in water naturally results in alkaline pH with $H_3SiO_4^-$ present in solution.

The present process illustrates effective segregation of layers without the need for synthetic polymer flocculants, or other standard coagulants such as aluminate or alum. Accordingly, aspects of the process involve the treatment of a slurry that is substantially free of added polymers or coagulants other than silicate ions. This may be of particular significance in respect to coagulants such as aluminate which may have deleterious biological characteristics.

In a further aspect of the present processes, methods are provided for segregating selected clay particles, having desired size, type, and crystallinity. In particular, X-ray diffraction analysis of the clay particles from each layer formed in the present examples showed that the bottom layer contains crystallized clay particles that include kaolinite, chlorite and illite minerals. In contrast, the top layer is comprised of relatively poorly crystallized clays, such as illite rich illite/smectite mixed layer clays, kaolinite and illite. The top layer nanoclays exhibit amphiphilic behaviour and range in size from 80 to 200 nm.

In an example of an EOR application for the top layer of nanoparticles disclosed herein, a suspension of this material was diluted down from 5-10 wt. % to 1 wt. % using deionized water and used as follows to exemplify enhanced oil recovery. A sand pack was first saturated with water followed by heavy crude oil of API gravity=16.6°. This EOR example was performed at room temperature. The amount of nanoclay suspension injected into the sand pack was fixed at 2 pore volumes. The oil-charged sand pack was first flooded with water followed by the nanoclay suspension and subsequently chased with water to recover heavy crude oil. The recovery of crude oil from water flooding alone was 26.4% whereas nanoclay suspension flooding followed by water flooding resulted in 32.6% additional recovery of crude oil, providing 59% total oil recovery. It was found that the present nanoclays performed better than alternative commercially available nanoparticles, such as $SiO_2$, $Al_2O_3$, $TiO_2$, $Fe_3O_4$, NiO, and CuO [13][14].

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as hereinbefore described and with reference to the examples and drawings.

REFERENCES

[1] Chalaturnyk, R. J., J. D. Scott and B. Ozum, 2002. Management of oil sands tailings. Petroleum Science and Technology 20(9): 1025-1046.

[2] Kasperski, K. L. "A review of properties and treatment of oil sands tailings." AOSTRA Journal of Research 8 (1992): 11-11.

[3] MacKinnon, M. D., and Sethi, A. 1993. A comparison of the physical and chemical properties of the tailings ponds at the Syncrude and Suncor oil sands plants. In Proceedings of Our Petroleum Future Conference, Alberta Oil Sands Technology and Research Authority (AOSTRA), Edmonton, Alta

[4] J. Don Scott, M. B. Dusseault, and W. David Carrier, "Behaviour of the clay/bitumen/water sludge system from oil sands extraction plants," Appl. Clay Sci., vol. 1, no. 1-2, pp. 207-218, 1985.

[5] K. L. Kaspersky, "A Review of Properties and Treatment of Oil Sands Tailings," AOSTRA J. Res., vol. 8, no. 11, pp. 11-44, 1992.

[6] C. Wang, D. Harbottle, Q. Liu, and Z. Xu, "Current state of fine mineral tailings treatment: A critical review on theory and practice," Miner. Eng., vol. 58, pp. 113-131, 2014.

[7] Aida Farkish, Mamadou Fall, "Rapid dewatering of oil sand mature fine tailings using super absorbent polymer (SAP)", Minerals Engineering, Volumes 50-51, 2013, Pages 38-47, ISSN 0892-6875

[8] A Sworska, J. S Laskowski, G Cymerman, "Flocculation of the Syncrude fine tailings: Part I. Effect of pH, polymer dosage and Mg2+ and Ca2+ cations", International Journal of Mineral Processing, Volume 60, Issue 2, 2000, Pages 143-152

[9] Vedoy, D. R. L. and Soares, J. B. P. (2015), Water-soluble polymers for oil sands tailing treatment: A Review. Can. J. Chem. Eng., 93: 888-904

[10] Suncor Energy Inc., 2009. Application for Tailings Reduction Operations (available on Energy Resources Conservation Board website)

[11] Oil Sands Tailings Technology Deployment Roadmap, Vol 1-4, Alberta Innovates

[12] A Screening Study of Oil Sand Tailings Technologies and Practices, Alberta Energy Research Institute

[13] Xiaofei Sun, Yanyu Zhang, Guangpeng Chen and Zhiyong Gai, Application of Nanoparticles in Enhanced Oil Recovery: A Critical Review of Recent Progress, Energies 2017, 10, 345

[14] Alomair, O. A., Matar, K. M., & Alsaeed, Y. H. (2014, Oct. 14). Nanofluids Application for Heavy Oil Recovery. Society of Petroleum Engineers. doi:10.2118/171539-MS

The invention claimed is:

1. A process for separating materials in a mixture, the process comprising:
   adding a source of silicate to the mixture, wherein the source of silicate acts as a flocculant;
   adding an alkali to the silicate-treated mixture, wherein the alkali initiates silicate polycondensation; and
   allowing the silicate-treated mixture to separate into a plurality of layers having distinct densities, wherein a bottom layer comprises a higher density of particles than an upper layer.

2. The process of claim 1 wherein the mixture comprises a mature fine tailing (MFT) mixture.

3. The process of claim 2 wherein the MFT mixture separates into a plurality of distinct layers having distinct densities within one day.

4. The process of claim 1 wherein the mixture comprises a fine fluid tailing (FFT) mixture.

5. The process of claim 1 wherein the mixture comprises an aqueous solution.

6. The process of claim 1 wherein the mixture further comprises a hydrocarbon.

7. The process of claim 6 wherein the hydrocarbon comprises bitumen.

8. The process of claim 1 wherein the solution further comprises a clay material.

9. The process of claim 1 wherein the alkali comprises $Ca(OH)_2$.

10. The process of claim 1 further comprising adding a biopolymer to the mixture.

11. The process of claim 10 wherein the biopolymer comprises a polysaccharide.

12. The process of claim 1 wherein the pH of the silicate-treated mixture is at least 9.

13. The process of claim 1 wherein the plurality of layers comprises a layer of water.

14. The process of claim 1 wherein the plurality of layers comprises a bottom layer having a dynamic shear stress of at least 1 kPa.

15. The process of claim 1 wherein the plurality of layers comprises a top layer further comprising nanoparticles.

16. The process of claim 15 wherein the nanoparticles are at a concentration of at least 0.5 percent by weight.

17. The process of claim 1 wherein separation into the plurality of distinct layers having distinct densities occurs within two days.

18. The process of claim 1 wherein a bitumen mat is disposed above the plurality of layers.

19. The process of claim 18 wherein the bitumen mat comprises at least 25% of the total initial bitumen content of the mixture.

20. The process of claim 1 wherein the plurality of layers comprises a top, middle, and bottom layer.

21. The process of claim 20 wherein the middle layer comprises at least 35 percent by weight solids.

* * * * *